(12) United States Patent
Kim et al.

(10) Patent No.: US 9,837,673 B2
(45) Date of Patent: Dec. 5, 2017

(54) MEMBRANE HUMIDIFIER FOR FUEL CELL

(71) Applicant: HYUNDAI MOTOR COMPANY, Seoul (KR)

(72) Inventors: Hyun Yoo Kim, Seoul (KR); Hyuck Roul Kwon, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 70 days.

(21) Appl. No.: 14/954,463

(22) Filed: Nov. 30, 2015

(65) Prior Publication Data
US 2017/0077531 A1 Mar. 16, 2017

(30) Foreign Application Priority Data

Sep. 11, 2015 (KR) .......................... 10-2015-0128716

(51) Int. Cl.
H01M 8/04 (2016.01)
B01F 3/04 (2006.01)
B01D 53/22 (2006.01)
H01M 8/04119 (2016.01)

(52) U.S. Cl.
CPC ........ *H01M 8/04149* (2013.01); *B01D 53/22* (2013.01); *B01F 3/04* (2013.01)

(58) Field of Classification Search
CPC ...... B01F 3/04; H01M 8/04149; B01D 53/22; B01D 2053/224

USPC ..................... 261/104; 95/52; 96/8
See application file for complete search history.

(56) References Cited

U.S. PATENT DOCUMENTS 6,755,399 B2 * 6/2004 Shimanuki ......... H01M 8/04119
261/104

FOREIGN PATENT DOCUMENTS

| JP | 2001-202978 A | 7/2001 |
| JP | 2002-292233 A | 10/2002 |
| JP | 2005-243553 A | 9/2005 |
| JP | 2012-134067 A | 7/2012 |
| KR | 10-2009-0057773 A | 6/2009 |

* cited by examiner

*Primary Examiner* — Robert A Hopkins
(74) *Attorney, Agent, or Firm* — McDermott Will & Emery LLP

(57) ABSTRACT

A membrane humidifier for a fuel cell, the membrane humidifier includes, a humidifier housing, and a bundle of hollow fiber membranes which has both ends potted by potting members and accommodated in the humidifier housing, wherein a bypass flow tube having a plurality of pores is also potted by the potting members in addition to the bundle of hollow fiber membranes, such that a part of dry air from an air blower is bypassed from the outside to the inside of the potting member through the bypass flow tube, and thereafter, the dry air is injected into an internal space of the humidifier housing where the bundle of hollow fiber membranes is present.

10 Claims, 6 Drawing Sheets

MEMBRANE HUMIDIFIER FOR FUEL CELL

CROSS-REFERENCE TO RELATED APPLICATION

This application claims under 35 U.S.C. §119 a the benefit of priority to Korean Patent Application No. 10-2015-0128716, filed on Sep. 11, 2015 with the Korean Intellectual Property Office, the entire contents of which are incorporated herein by reference.

TECHNICAL FIELD

The present disclosure relates to a membrane humidifier for a fuel cell. More particularly, it relates to a membrane humidifier for a fuel cell which is capable of easily discharging condensate water collected in the membrane humidifier to the outside.

BACKGROUND

In general, humidification of an electrolyte membrane in a fuel cell is needed to operate the fuel cell, and in this case, a humidifying apparatus is used which is operated in a manner where humid gas discharged from the fuel cell exchanges moisture with dry gas supplied from outside.

Examples of the humidifying apparatus for the fuel cell include ultrasonic humidifiers, steam humidifiers, evaporative humidifiers, and the like, and as a humidifying apparatus used for the fuel cell, a membrane humidifier, which uses a hollow fiber membrane, is generally used.

Here, a configuration and an operation of a membrane humidifier for a fuel cell in the related art will be described below.

The attached FIG. 1 illustrates an air supply system of a fuel cell system, and FIG. 2 illustrates a membrane humidifier structure included in the air supply system in the related art.

The fuel cell system includes a fuel supply system which supplies fuel (hydrogen) to a fuel cell stack, an air supply system which supplies oxygen, which is an oxidizing agent required for an electrochemical reaction and contained in air, to the fuel cell stack, a heat and water management system which controls an operating temperature of the fuel cell stack, and the fuel cell stack which substantially generates electrical energy using hydrogen and air.

Therefore, when hydrogen is supplied from the fuel supply system to a fuel electrode of the fuel cell stack, and at the same time, oxygen is supplied from the air supply system to an air electrode of the fuel cell stack, an oxidation reaction of hydrogen is carried out at the fuel electrode such that hydrogen ions (protons) and electrons are produced, and the produced hydrogen ions and electrons are moved to the air electrode through an electrolyte membrane and a separating plate, respectively. Water is produced at the air electrode caused by an electrochemical reaction among oxygen contained in air and the hydrogen ions and the electrons, which have been moved from the fuel electrode, and at the same time, electrical energy is generated from a flow of the electrons.

As illustrated in FIG. 1, the air supply system includes a membrane humidifier 100 and an air blower 202 to supply humidified air (oxygen) to a fuel cell stack 200.

Therefore, outside dry air is supplied into the hollow fiber membrane of the membrane humidifier 100 by a suction operation of the air blower 202. Simultaneously, discharge gas (humid air), which is discharged from the fuel cell stack 200 after the reaction, passes through the membrane humidifier 100, and in this case, moisture contained in the discharge gas permeates into the hollow fiber membrane such that dry air is humidified.

Referring to the attached FIG. 2, the membrane humidifier 100 in the related art includes a housing 101 which has a supply port 102 formed at one end of the housing 101 and into which dry air flows from the air blower, and a discharge port 103 formed at the other end of the housing 101 and from which humidified dry air is discharged.

In addition, a bundle of hollow fiber membranes, in which a plurality of hollow fiber membranes 106 is concentrated, are accommodated in the housing 101, and both ends of the bundle of hollow fiber membranes are accommodated by being potted by typical potting members 108.

In addition, an inlet 104 into which humid air discharged from the fuel cell stack flows is formed in one circumferential portion of the housing 101, and an outlet 105, from which humid air from which moisture has been removed is discharged, is formed in the other circumferential portion.

Therefore, when the discharge gas, which has been discharged from the fuel cell stack after the reaction is completed, that is, the humid air is supplied from the inlet 104 of the housing 101 to the hollow fiber membranes 106, moisture is separated from the humid air by a capillary action in the respective hollow fiber membranes 106. The separated moisture is condensed while passing through capillary tubes in the hollow fiber membranes 106, and then moved into the hollow fiber membranes 106.

Next, the humid air from which moisture has been separated is moved along the outside of the hollow fiber membranes 106, and then discharged through the outlet 105 of the housing 101.

At the same time, outside gas (dry air) is supplied through the supply port 102 of the housing 101 by the operation of the air blower. The dry air, which is supplied through the supply port 102, is moved through the hollow fiber membranes 106, and since the moisture separated from the humid air has been already moved into the hollow fiber membranes 106, the dry air is humidified by the moisture and the humidified dry air is supplied to the air electrode of the fuel cell stack through the discharge port 103.

Meanwhile, the fuel cell stack (hereinafter, referred to as a stack) is mounted at a position at which water (vapor condensation), which is produced at the stack during the operation of the fuel cell system or after the fuel cell system is stopped, is smoothly discharged from the stack. The reason is that in a case where condensed water flows to the stack, the condensed water blocks a part or the entirety of air flow paths (stack manifolds, cell inlet and outlet, respective channels in the cell) of the stack and hinders supply of gas (hydrogen and air) supplied at the time of starting the fuel cell or during the operation of the fuel cell, thereby causing a deterioration in performance of the stack and a potential issue with durability.

Therefore, most of the water produced at the stack inevitably flows by gravity towards a humidifier positioned at a lower end of the stack. As a result, as illustrated in the attached FIG. 3, water is collected at the bottom side in the humidifier housing 101, and the collected water is present over the inside and the outside of the potting member 108.

In addition, another reason why the condensate water is collected in the humidifier is that, as illustrated in the attached FIG. 4, dew condensation occurs due to a difference in temperature from the outside during the operation of the fuel cell at a line that connects the humidifier housing 101 and an inlet of the stack 200. The condensate water caused by the dew condensation flows downward, and then is collected in the humidifier housing.

In a case in which condensed or collected water is present in the humidifier, the water becomes frozen during the winter, and as a result, an air flow path in the humidifier becomes narrow. At the same time, pressure in the humidifier increases. For this reason, there are potential issues in that a load of the air blower for blowing air to the humidifier is increased, and power consumed by the air blower is increased.

In addition, when the water collected in the humidifier is frozen, the hollow fiber membrane, the potting member, the humidifier housing, and the like may be damaged due to volume expansion.

In addition, when output is rapidly increased (e.g., idle max. or high output), a flow velocity of air supplied to the stack may be increased such that the condensate water collected in the humidifier or attached to a surface of the humidifier also flows into the stack. As a result, there are potential issues in that flow paths in the stack are blocked, and thus cells are damaged In consideration of the above problems, there are various related arts for discharging water collected in the humidifier housing, but as illustrated by ⓐ and ⓑ in FIG. 3, there is a drawback in that it may be impossible to discharge water collected in a space (a deep valley) between an outer surface of the potting member 108 and both wall surfaces of the humidifier housing 101.

The above information disclosed in this Background section is only for enhancement of understanding the background of the disclosure and therefore it may contain information that does not form the prior art that is already known in this country to a person of ordinary skill in the art.

SUMMARY OF THE DISCLOSURE

The present disclosure has been made in an effort to solve the above-described problems associated with the prior art, and to provide a membrane humidifier for a fuel cell, in which a bypass flow path, which allows a part of dry air supplied from an air blower to be bypassed from the outside to the inside of a potting member and thereafter allows the dry air to be injected into an internal space in a humidifier housing where a bundle of hollow fiber membranes are present, is potted together with the bundle of hollow fiber membranes, thereby smoothly discharging condensate water collected in the humidifier by pressure of air being discharged.

In one aspect, the present disclosure provides a membrane humidifier for a fuel cell, the membrane humidifier including: a humidifier housing; and a bundle of hollow fiber membranes which have both ends that are potted by potting members and accommodated in the humidifier housing, in which one or two or more bypass flow tubes having a plurality of pores are also potted by the potting members in addition to the bundle of hollow fiber membranes, such that a part of dry air from an air blower is bypassed from the outside to the inside of the potting member through the bypass flow tube, and thereafter, the dry air is injected into an internal space of the humidifier housing where the bundle of hollow fiber membranes are present.

In a preferred embodiment, a hollow fiber membrane having large pores may be adopted as the bypass flow tube.

In another preferred embodiment, any one of a plastic tubing and a metal tubing, which has a larger diameter than the hollow fiber membrane and has a plurality of pores, may be adopted as the bypass flow tube.

In still another preferred embodiment, disconnected hollow fiber membranes may be adopted as the bypass flow tube.

In yet another preferred embodiment, the bypass flow tube may be arranged to be biased to a bottom side of the humidifier housing.

In still yet another preferred embodiment, the pores may be formed over an overall length of the bypass flow tube or formed only in a front end portion or a rear end portion of the overall length.

Through the aforementioned technical solutions, the present disclosure provides the effects below.

First, a part of dry air supplied from the air blower is bypassed from the outside to the inside of the potting member through the bypass flow tube, and then injected into the internal space of the humidifier housing where the bundle of hollow fiber membranes are present, such that condensate water collected at a bottom side of the humidifier housing (particularly, condensate water collected at a bottom side of the humidifier housing outside the potting member) may be easily discharged to the outside by pressure of air being discharged, through an inlet of the humidifier housing for humid air where pressure is low or through an outlet for humid air from which moisture has been removed.

Second, since water collected in the humidifier is discharged to the outside, it is possible to prevent damage to the hollow fiber membrane, the potting member, and the humidifier housing, which has occurred when water collected in the existing humidifier is frozen.

Other aspects and preferred embodiments of the disclosure are discussed infra.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles, e.g., fuel derived from resources other than petroleum. As referred to herein, a hybrid vehicle is a vehicle that has two or more sources of power, for example, both gasoline-powered and electric-powered vehicles.

The above and other features of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
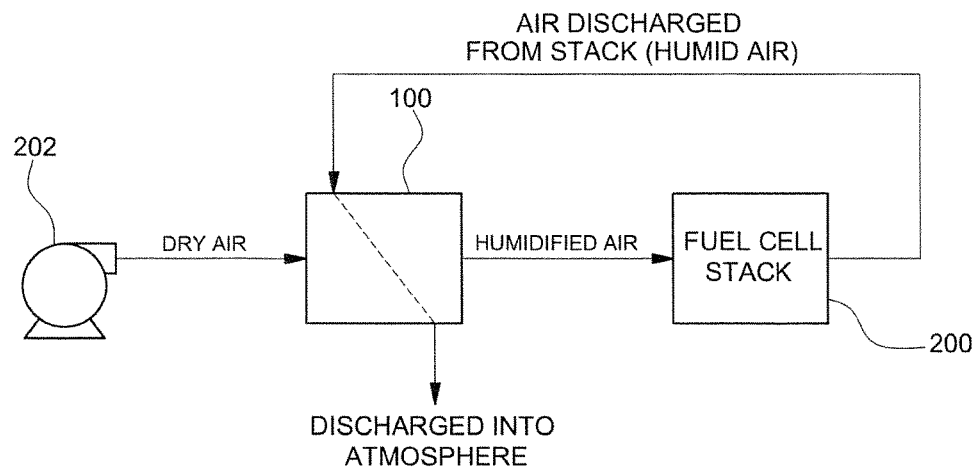
FIG. 1 is a configuration diagram illustrating an air supply system of a fuel cell system.
Figure 2:
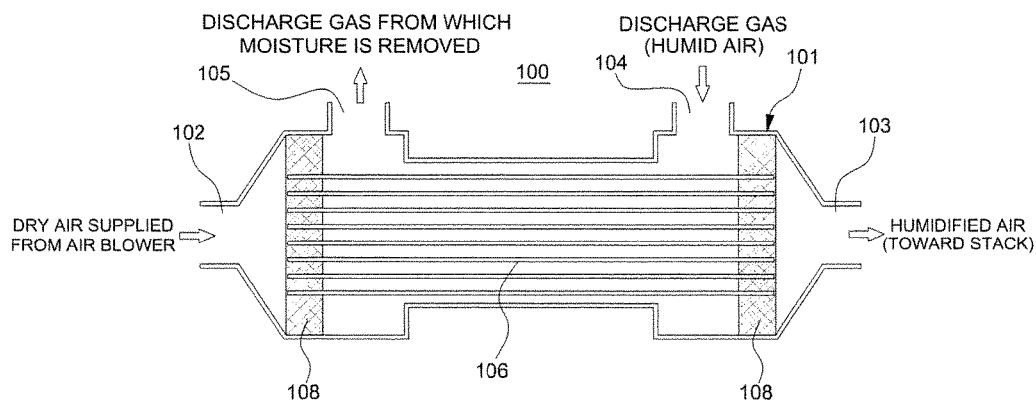
FIG. 2 is a schematic cross-sectional view illustrating a structure of a membrane humidifier for a fuel cell in the related art.
Figure 3:
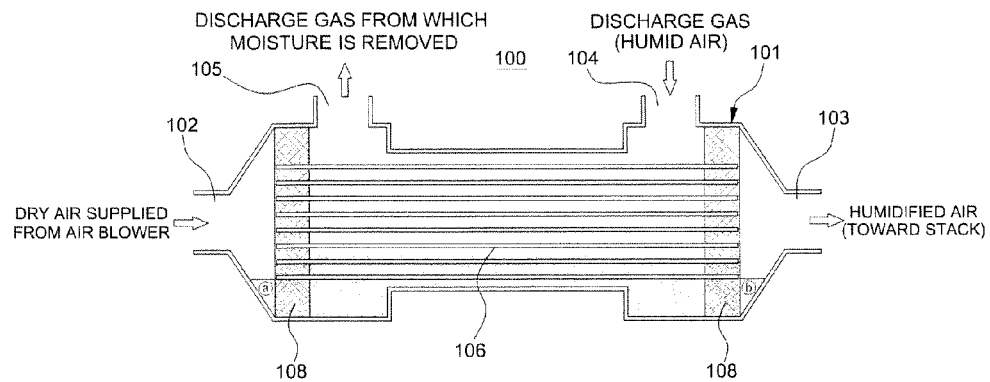
FIGS. 3 and 4 are schematic views illustrating a state in which condensate water is collected in the membrane humidifier for a fuel cell in the related art.
Figure 4:
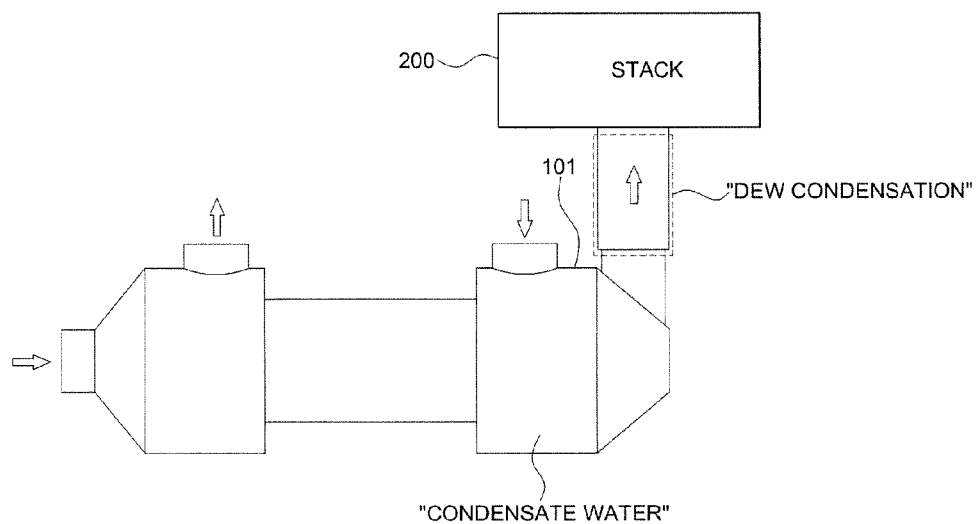

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter, reference will now be made in detail to various embodiments of the present disclosure, examples of which are illustrated in the accompanying drawings and described below. While the disclosure will be described in conjunction with exemplary embodiments, it will be understood that the present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

Hereinafter, exemplary embodiments of the present disclosure will be described in detail with reference to the accompanying drawings.

Figure 5:
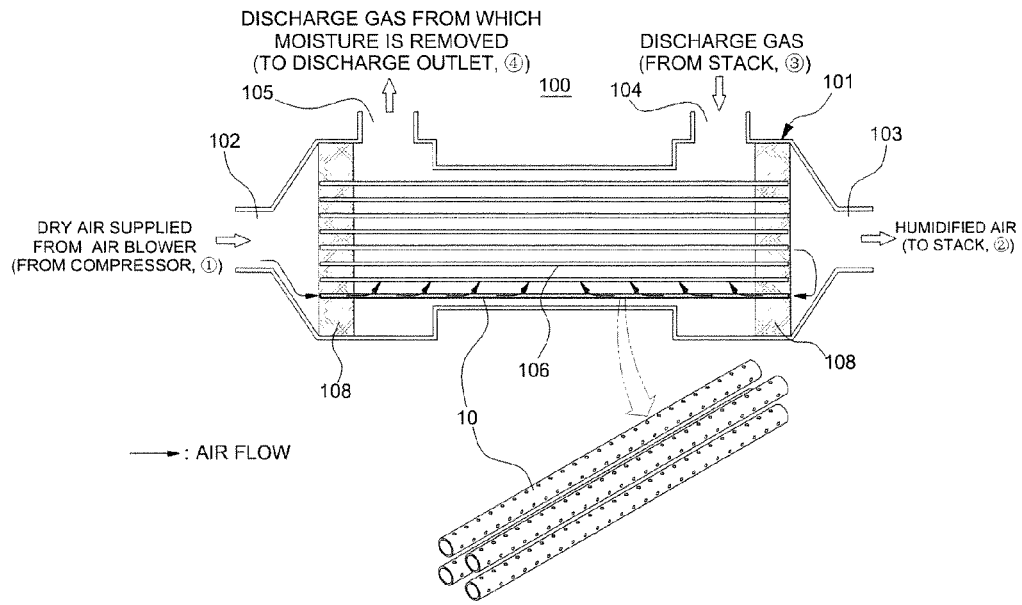
FIG. 5 is a cross-sectional view illustrating a membrane humidifier for a fuel cell according to a first exemplary embodiment of the present disclosure.

The attached FIG. 5 is a cross-sectional view illustrating a membrane humidifier for a fuel cell according to a first exemplary embodiment of the present disclosure.

As illustrated in FIG. 5, a membrane humidifier 100 may include a housing 101 which has a supply port 102 formed at one end of the housing 101 and into which dry air flows from an air blower, and a discharge port 103 which is formed at the other end of the housing 101 and from which humidified dry air is discharged.

In addition, an inlet 104 into which humid air discharged from the fuel cell stack flows may be formed in one circumferential portion of the housing 101, and an outlet 105 from which humid air from which moisture has been removed is discharged may be formed in the other circumferential portion.

In addition, a bundle of hollow fiber membranes, in which a plurality of hollow fiber membranes 106 may be concentrated, are accommodated in the housing 101, and both ends of the bundle of hollow fiber membranes are accommodated by being potted by typical potting members 108.

In particular, in addition to the bundle of hollow fiber membranes, one or two or more hollow fiber membrane 10, which serve as bypass flow tubes according to the first exemplary embodiment of the present disclosure and have a plurality of large pores, are also potted by the potting members 108, and arranged to be biased to the bottom side of the humidifier housing 101.

In more detail, when both ends of the bundle of hollow fiber membranes are potted by the potting members 108, both ends of the hollow fiber membrane 10 having the large pores are also potted by the potting members 108. Thereafter, when the bundle of hollow fiber membranes and the hollow fiber membrane 10 having the large pores are accommodated in the humidifier housing 101, the hollow fiber membrane 10 having the large pores may be arranged to be biased to the bottom side of the humidifier housing 101.

In this case, the hollow fiber membranes 106, which constitute the bundle of hollow fiber membranes, have characteristics in that outside humid air can permeate into the hollow fiber membranes 106 by a capillary action but dry air flowing in the hollow fiber membranes 106 cannot be discharged to the outside. As a result, the hollow fiber membrane 10, which has the plurality of large pores so as to be able to discharge air and water, is adopted as the bypass flow tube according to the first exemplary embodiment of the present disclosure.

Therefore, each of the hollow fiber membranes 106, which constitute the bundle of hollow fiber membranes, has nano-scale pores and serves as a humidifier membrane, and the hollow fiber membrane 10 having the large pores serves to bypass air and water and discharge the air and water to the outside.

Meanwhile, as illustrated in FIG. 5, pressure in the respective portions of the humidifier housing 101 is decreased in the order of ①>②>③>④.

In more detail, because the supply port 102 of the humidifier housing 101 into which dry air flows is a portion into which air compressed by the air blower flows, pressure in the supply port 102 is greatest, and in consideration of pressure drop in accordance with an air flow, pressure is decreased in the order of the discharge port 103 from which humidified dry air is discharged, the inlet 104 into which humid air flows, and the outlet 105 for discharging humid air from which moisture has been removed.

Therefore, in a case where a bypass flow path is formed from the supply port 102 and/or the discharge port 103 to the inlet 104 or the outlet 105, air flows and is discharged minutely through the bypass flow path, and thus the condensate water collected at the bottom side of the humidifier housing may also be discharged.

Here, an operation of discharging the condensate water in the membrane humidifier according to the first exemplary embodiment of the present disclosure will be described below.

First, outside gas (dry air) is supplied through the supply port 102 of the housing 101 by the operation of the air blower.

Then, a part of the dry air from the air blower is bypassed from the outside to the inside of the potting member 108 through the hollow fiber membrane 10, which has the large pores and is adopted as the bypass flow tube according to the first exemplary embodiment of the present disclosure. Thereafter, the dry air is injected through the large pores of the hollow fiber membrane 10 into the internal space of the humidifier housing 101 where the bundle of hollow fiber membranes are present.

In this case, condensate water collected in a space (a deep valley) between an outer surface of the potting member 108 and both wall surfaces of the humidifier housing 101 is sucked, together with air from the air blower, along the hollow fiber membrane 10 having the large pores, and discharged through the large pores of the hollow fiber membrane 10 into the internal space of the humidifier housing 101 where the bundle of hollow fiber membranes are present.

In addition, pressure of the flow of air, which is discharged through the large pores of the hollow fiber membrane 10 into the internal space of the humidifier housing 101 where the bundle of hollow fiber membranes are present, is applied to the condensate water collected at the bottom side of the humidifier housing 101.

As described above, the air, which is injected through the large pores of the hollow fiber membrane 10 flows toward the outlet 105 where pressure is low (see the arrow in FIG. 5), and by the air flow, the condensate water is also easily discharged to the outside through the outlet 105 where pressure is lowest.

The second and third exemplary embodiments of the present disclosure have the same configuration as the above first exemplary embodiment, but there is a difference in that a half length of the hollow fiber membrane 10, which has the large pores and is adopted as the bypass flow tube, is adopted.

Figure 6:
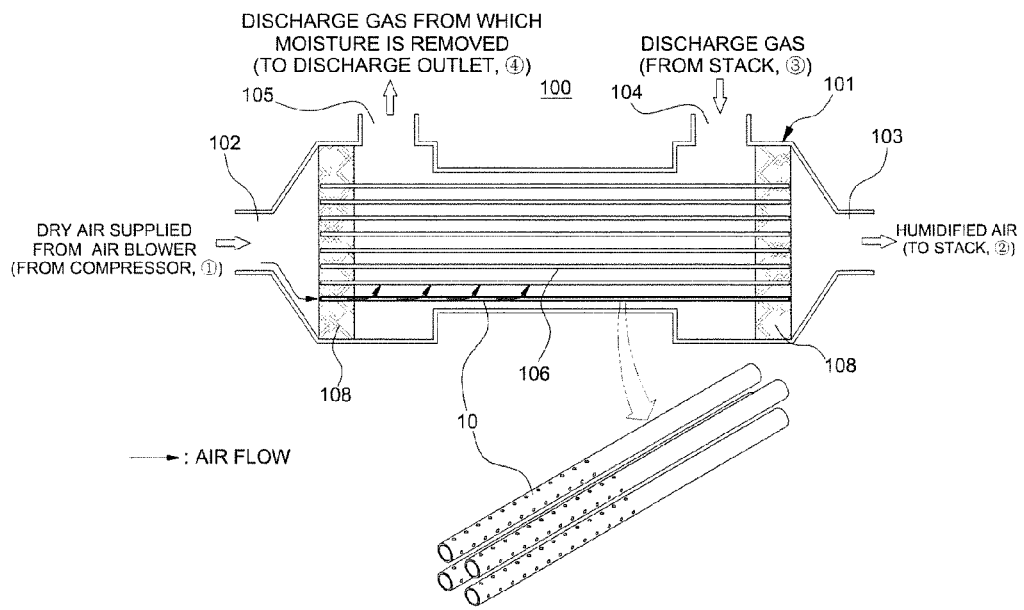
FIG. 6 is a cross-sectional view illustrating a membrane humidifier for a fuel cell according to a second exemplary embodiment of the present disclosure.
Figure 7:
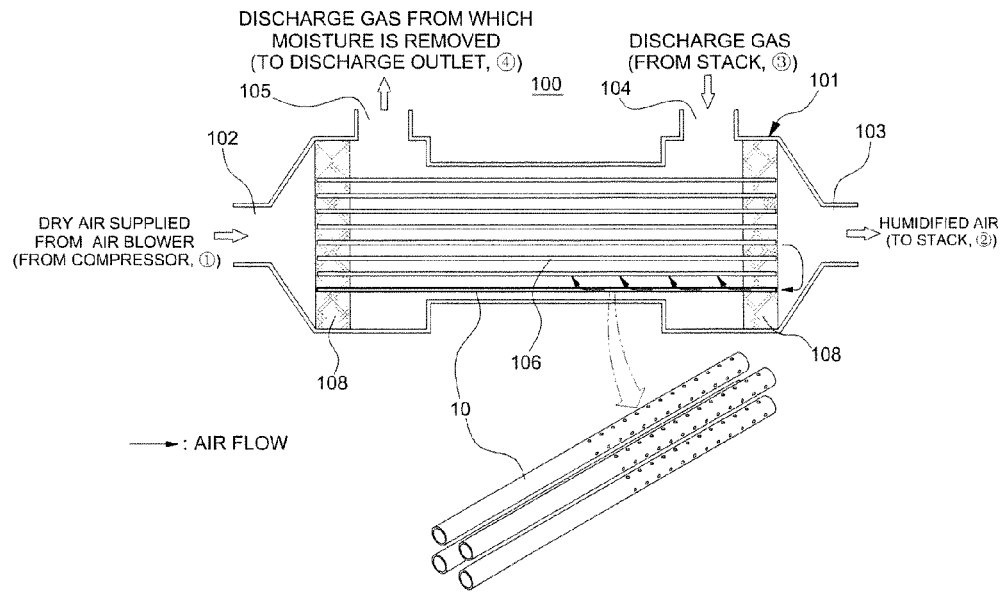
FIG. 7 is a cross-sectional view illustrating a membrane humidifier for a fuel cell according to a third exemplary embodiment of the present disclosure.

As illustrated in FIG. 6, the second exemplary embodiment of the present disclosure is characterized in that only a length of the hollow fiber membrane 10, which corresponds to a front end portion of the hollow fiber membrane 10 having the large pores according to the first exemplary embodiment, is potted by one potting member 108, and as illustrated in FIG. 7, the third exemplary embodiment of the present disclosure is characterized in that only a length of the hollow fiber membrane 10, which corresponds to a rear end portion of the hollow fiber membrane 10 having the large pores according to the first exemplary embodiment, is potted by the other potting member 108.

As described above, the length and the number of hollow fiber membrane 10, which has the large pores and is adopted as the bypass flow path, may be appropriately adjusted in accordance with the type and the size of the humidifier.

Because an operation of discharging the condensate water in the membrane humidifier according to the second and third exemplary embodiments of the present disclosure is identical to that in the above first exemplary embodiment, a description thereof will be omitted.

Figure 8:
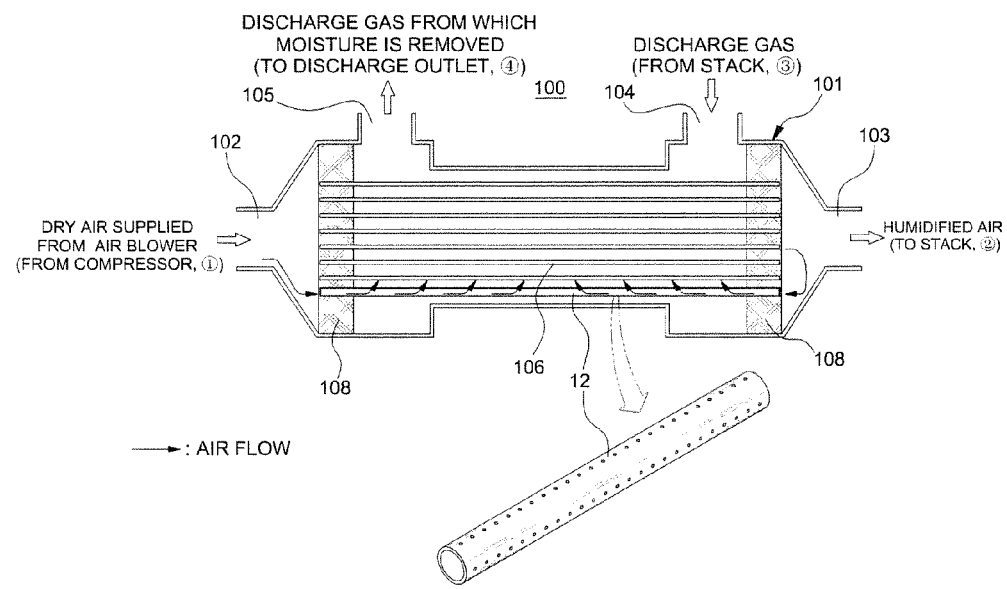
FIG. 8 is a cross-sectional view illustrating a membrane humidifier for a fuel cell according to a fourth exemplary embodiment of the present disclosure.

The attached FIG. 8 is a cross-sectional view illustrating a membrane humidifier for a fuel cell according to a fourth exemplary embodiment of the present disclosure.

The fourth exemplary embodiment of the present disclosure is configured identically to the above first exemplary embodiment, but differs from the above first exemplary embodiment in that tubing 12, which has a larger diameter than each of the hollow fiber membranes that constitute the bundle of hollow fiber membranes, has a plurality of pores, and is made of plastic or metal, is adopted as the bypass flow tube.

The hollow fiber membrane 10, which has the large pores and is adopted in the first to third exemplary embodiments, has a small diameter, such that a plurality of hollow fiber membranes are potted together, but the tubing 12 according to the fourth exemplary embodiment, which is made of plastic or metal, has a large diameter, such that an effect of discharging water may be achieved even by using a single tubing 12.

Because an operation of discharging the condensate water in the membrane humidifier according to the fourth exemplary embodiment of the present disclosure is identical to that in the above first exemplary embodiment, a description thereof will be omitted.

The fifth and sixth exemplary embodiments of the present disclosure have the same configuration as the above fourth exemplary embodiment, but there is a difference in that a half length of the tubing 12, which is made of plastic or metal and adopted as the bypass flow tube, is adopted.

Figure 9:
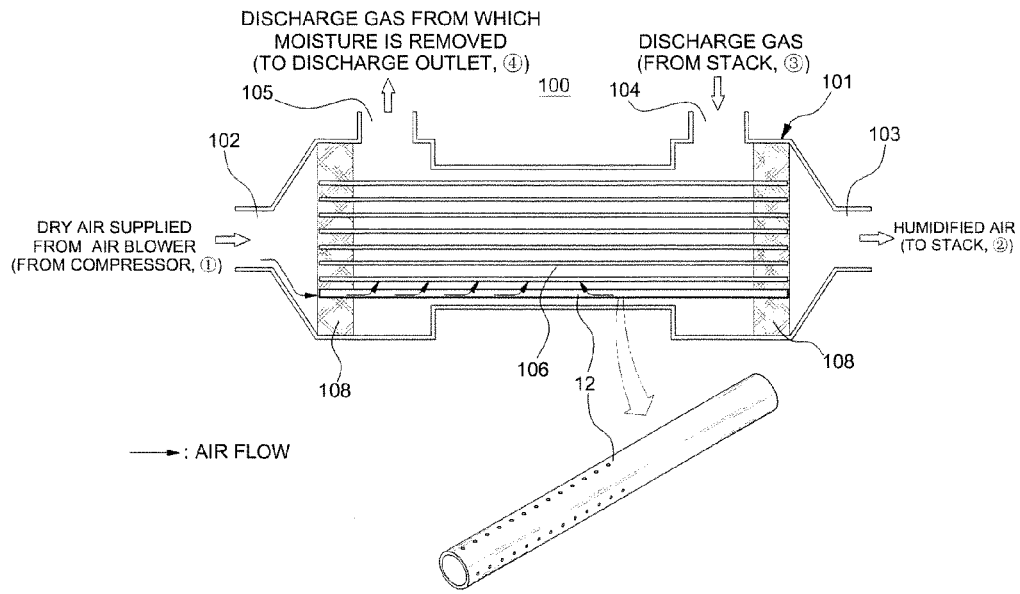
FIG. 9 is a cross-sectional view illustrating a membrane humidifier for a fuel cell according to a fifth exemplary embodiment of the present disclosure.
Figure 10:
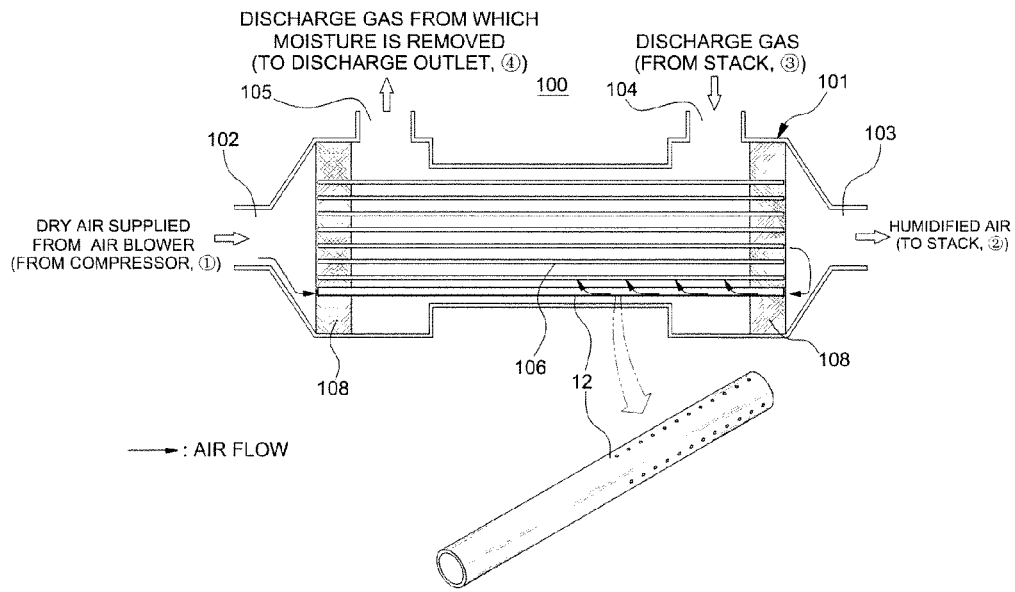
FIG. 10 is a cross-sectional view illustrating a membrane humidifier for a fuel cell according to a sixth exemplary embodiment of the present disclosure.

As illustrated in FIG. 9, the fifth exemplary embodiment of the present disclosure is characterized in that only a length of the tubing 12, which corresponds to a front end portion of the tubing 12 made of plastic or metal according to the fourth exemplary embodiment, is potted by one potting member 108. As illustrated in FIG. 10, the sixth exemplary embodiment of the present disclosure is characterized in that only a length of the tubing 12, which corresponds to a rear end portion of the tubing 12 made of plastic or metal according to the fourth exemplary embodiment, is potted by the other potting member 108.

As described above, the length and the number of tubing 12, which is made of plastic or metal and adopted as the bypass flow path, may be appropriately adjusted in accordance with the type and the size of the humidifier.

As an operation of discharging the condensate water in the membrane humidifier according to the fifth and sixth exemplary embodiments of the present disclosure is identical to that in the above first exemplary embodiment, a description thereof will be omitted.

Figure 11:
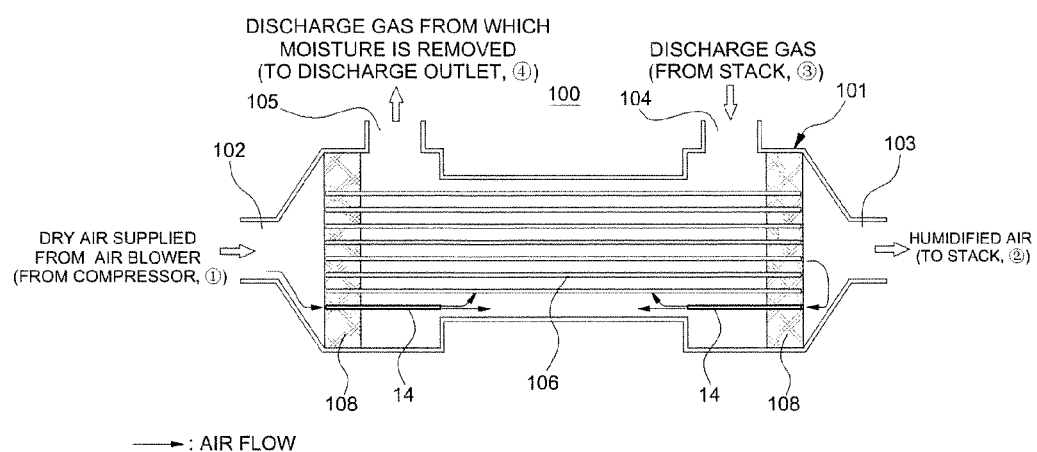
FIG. 11 is a cross-sectional view illustrating a membrane humidifier for a fuel cell according to a seventh exemplary embodiment of the present disclosure.

The attached FIG. 11 is a cross-sectional view illustrating a membrane humidifier for a fuel cell according to a seventh exemplary embodiment of the present disclosure.

Unlike the above first to sixth exemplary embodiments, the seventh exemplary embodiment of the present disclosure is characterized in that the hollow fiber membrane, which constitutes the bundle of hollow fiber membranes, is utilized as the bypass flow tube.

The hollow fiber membranes 106, which constitute the bundle of hollow fiber membranes, have characteristics in that outside humid air can permeate into the hollow fiber membranes 106 by a capillary action but dry air flowing in the hollow fiber membranes 106 cannot be discharged to the outside, and as a result, disconnected hollow fiber membranes 14 are adopted as the bypass flow tubes according to the seventh exemplary embodiment of the present disclosure.

The disconnected hollow fiber membranes 14 are provided by dividing in advance the hollow fiber membranes into two pieces, which may be potted by one and the other potting members 108, respectively, or may be provided by potting a single hollow fiber membrane and disconnecting a middle portion of the single hollow fiber membrane.

Therefore, a disconnected portion of the disconnected hollow fiber membranes 14 is present in an opened state in the humidifier housing 101.

Therefore, a part of the dry air from the air blower is bypassed from the outside to the inside of the potting member 108 through the disconnected hollow fiber membranes 14 which are adopted as the bypass flow tube according to the seventh exemplary embodiment of the present disclosure. Thereafter, the dry air may be easily injected through the disconnected portion of the disconnected hollow fiber membranes 14 into the internal space of the humidifier housing 101 where the bundle of hollow fiber membranes is present.

Unlike the first to sixth exemplary embodiments, the existing hollow fiber membranes can be utilized as the bypass flow tube according to the seventh exemplary embodiment of the present disclosure, and as a result, the seventh exemplary embodiment of the present disclosure has an advantage in terms of manufacturing costs.

Because an operation of discharging the condensate water in the membrane humidifier according to the seventh exemplary embodiment of the present disclosure is identical to that in the above first exemplary embodiment, a description thereof will be omitted.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. A membrane humidifier for a fuel cell, the membrane humidifier comprising:
   a humidifier housing; and
   a bundle of hollow fiber membranes which has both ends potted by potting members and accommodated in the humidifier housing,
   wherein a bypass flow tube having a plurality of pores is also potted by the potting members in addition to the bundle of hollow fiber membranes, such that a part of dry air from an air blower is bypassed from the outside to the inside of the potting member through the bypass flow tube, and thereafter, the dry air is injected into an internal space of the humidifier housing where the bundle of hollow fiber membranes is present.

2. The membrane humidifier of claim 1, wherein a hollow fiber membrane having large pores is adopted as the bypass flow tube.

3. The membrane humidifier of claim 1, wherein plastic tubing, which has a larger diameter than the hollow fiber membrane and has a plurality of pores, is adopted as the bypass flow tube.

4. The membrane humidifier of claim 1, wherein disconnected hollow fiber membranes are adopted as the bypass flow tube.

5. The membrane humidifier of claim 1, wherein the bypass flow tube is arranged to be biased to a bottom side of the humidifier housing.

6. The membrane humidifier of claim 1, wherein the pores are formed over an overall length of the bypass flow tube.

7. A membrane humidifier for a fuel cell, the membrane humidifier comprising:
   a humidifier housing; and
   a bundle of hollow fiber membranes which has both ends potted by potting members and accommodated in the humidifier housing,
   wherein a plurality of bypass flow tubes having a plurality of pores are also potted by the potting members in addition to the bundle of hollow fiber membranes, such that a part of dry air from an air blower is bypassed from the outside to the inside of the potting member through the bypass flow tubes, and thereafter, the dry air is injected into an internal space of the humidifier housing where the bundle of hollow fiber membranes is present.

8. The membrane humidifier of claim 1, wherein metal tubing, which has a larger diameter than the hollow fiber membrane and has a plurality of pores, is adopted as the bypass flow tube.

9. The membrane humidifier of claim 1, wherein the pores are formed only in a front end portion of an overall length of the bypass flow tube.

10. The membrane humidifier of claim 1, wherein the pores are formed only in a rear end portion of an overall length of the bypass flow tube.

* * * * *